EVENT RECORDER

Filed Aug. 22, 1966 5 Sheets-Sheet 1

INVENTORS
HAROLD REDVERS MORTLEY
THOMAS GRANDIN CHAPMAN
MORLEY JAMES GOODSPEED
JOHN VIVIAN SAVAGE
By McGlew and Toren
Attorneys

EVENT RECORDER

INVENTORS
HAROLD REDVERS MORTLEY
THOMAS GRANDIN CHAPMAN
MORLEY JAMES GOODSPEED
JOHN VIVIAN SAVAGE
By McGlew and Toren
Attorneys 3,467,305
Patented Sept. 16, 1969

3,467,305

EVENT RECORDER

Harold Redvers Mortley, 29 7th Ave., Windsor, Brisbane, Queensland, Australia; Thomas Grandin Chapman, 37 Getting Crescent, Campbell, Australian Capital Territory, Australia; Morley James Goodspeed, 81 Theodore St., Curtin, Australian Capital Territory, Australia; and John Vivian Savage, 14 Garling St., Lyneham, Australian Capital Territory, Australia Filed Aug. 22, 1966, Ser. No. 574,133
Claims priority, application Australia, Aug. 23, 1965, 63,082/65
Int. Cl. G06k *1/02;* B26f *1/04*
U.S. Cl. 234—1 14 Claims

ABSTRACT OF THE DISCLOSURE

An event recorder includes tape feeding means, a first punch operable to punch sprocket holes in the tape and interconnected with the tape feeding means to advance the tape a predetermined distance responsive to each operation of the first punch, and at least one second punch operable to punch information holes in the tape. The first and second punches are aligned transversely of the tape so that sprocket holes and information holes are aligned transversely of the tape. A timing mechanism operates the first punch at predetermined time intervals to punch a sprocket hole in the tape, and the first punch is also operated simultaneously with the second punch or punches to punch a sprocket hole transversely aligned with the information holes.

This invention relates to instruments for recording events and is concerned particularly, but not exclusively, with the recordal of hydrologic data.

Recent rapid expansion in the collection of hydrologic events and is concerned particularly, but not exclusively, data and the use of computers to process such data has emphasized the need for simple field equipment capable of recording data in a form suitable for direct input to a digital computer. Such equipment is most urgently needed to record rainfall data, since the processing of currently available chart records, either manually or by semi-automatic conversion equipment, is particularly time consuming. It is, accordingly, a specific object of this invention to provide apparatus which can be installed in the field to record rainfall data in a form which is suitable for direct input to a digital computer.

According to the invention there is provided an event recorder comprising tape feeding means for event recordal punch tape, a first punch operable to punch sprocket holes in said tape operably interconnected with the tape feeding means such that the tape is advanced through a predetermined distance consequent to each operation of the first punch, a second punch operable to punch information holes in said tape and operably interconnected with the first punch so that the first punch is operated simultaneously with it, and means to cause the first punch to operate independently at predetermined time intervals.

Preferably the first and second punches are operated by electrical energization of first and second solenoids respectively.

Preferably too, the first and second solenoids are connected in an electric circuit which provides the operable interconnection between the first and second punches.

Preferably further, the means to cause the first punch to operate independently at predetermined time intervals comprises an electric timer connected to the first solenoid.

The tape feeding means preferably comprises a sprocket having teeth which engage the sprocket holes formed in the tape by the first punch and a mechanism which rotates the sprocket on return motion of the first solenoid. The recorder may also include a third punch, or further additional punches, being adapted to punch holes into the tape representing additional information or events, and being interconnected with said first punch in a manner like that defining the interconnection between said first and second punches.

In order that the invention may be more fully explained, a preferred embodiment thereof will now be described in detail with reference to the accompanying drawings in which.

Figure 1:
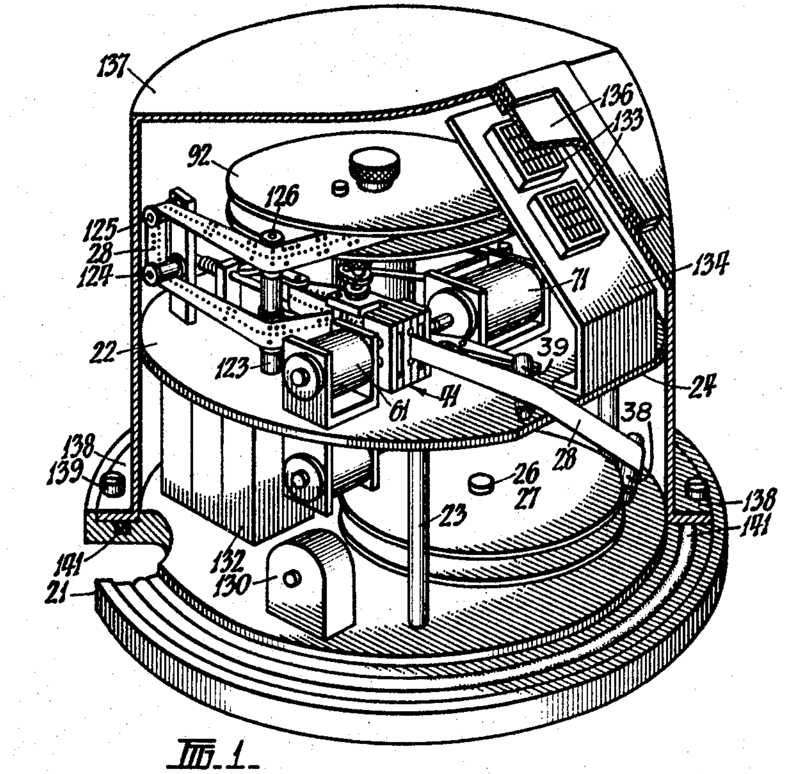
FIGURE 1 is a cut-away perspective view of an event recorder constructed in accordance with the invention.
Figure 2:
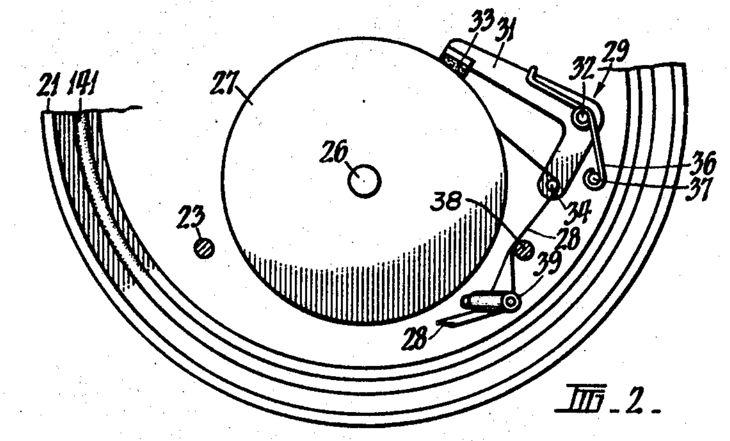
FIGURE 2 is a plan view of a tape delivery spool, an associated spool-braking device and part of a base plate of the recorder illustrated in FIGURE 1.

The illustrated event recorder comprises a circular base plate 21 above which a platform 22 is supported by means of supporting columns 23. The platform 22 is in the form of a segmental plate which is of smaller diameter than base plate 21 and almost describes a complete circle. For convenience of description, reference will be made to the front and rear ends of platform 22, the front end being delimited by its straight edge 24.

A supply spool 27 of standard 5-level data recordal paper tape is rotatably mounted on a peg 26 on base plate 21. A conventional spool-braking device denoted generally as 29 is provided to ensure the uniform tension is maintained in the tape being withdrawn from delivery spool 27. This device comprises a bell crank 31 which is pivotally mounted on a vertical pivot pin 32 adjacent delivery spool 27 and carries a brake shoe 33 at one end and a vertical tape guide pin 34 at the other. A spring 36, which is anchored at one end to a pin 37 on base plate 21 and is coiled around pivot pin 32, acts on bell crank 31 to force brake shoe 33 against the rim of spool 27 and tape 28 is passed around guide pin 34 so that tension in the tape opposes the braking action.

Tape 28 is passed from guide pin 34 of tensioning device 29 to a relatively large diameter guide pin 38 which is fixed to base plate 21 immediately below straight edge portion 24 of platform 22 and is canted from the vertical. This allows tape 28 to be passed upwardly at an angle and over the straight edge 24 (which thereby serves as a guide surface) to a further guide pin 39 which is mounted on platform 22 adjacent straight edge 24 and is also canted to the vertical. The tape then extends rearwardly of platform 22 to a punching head mounted on the platform and denoted generally as 41.

Figures 3, 4:
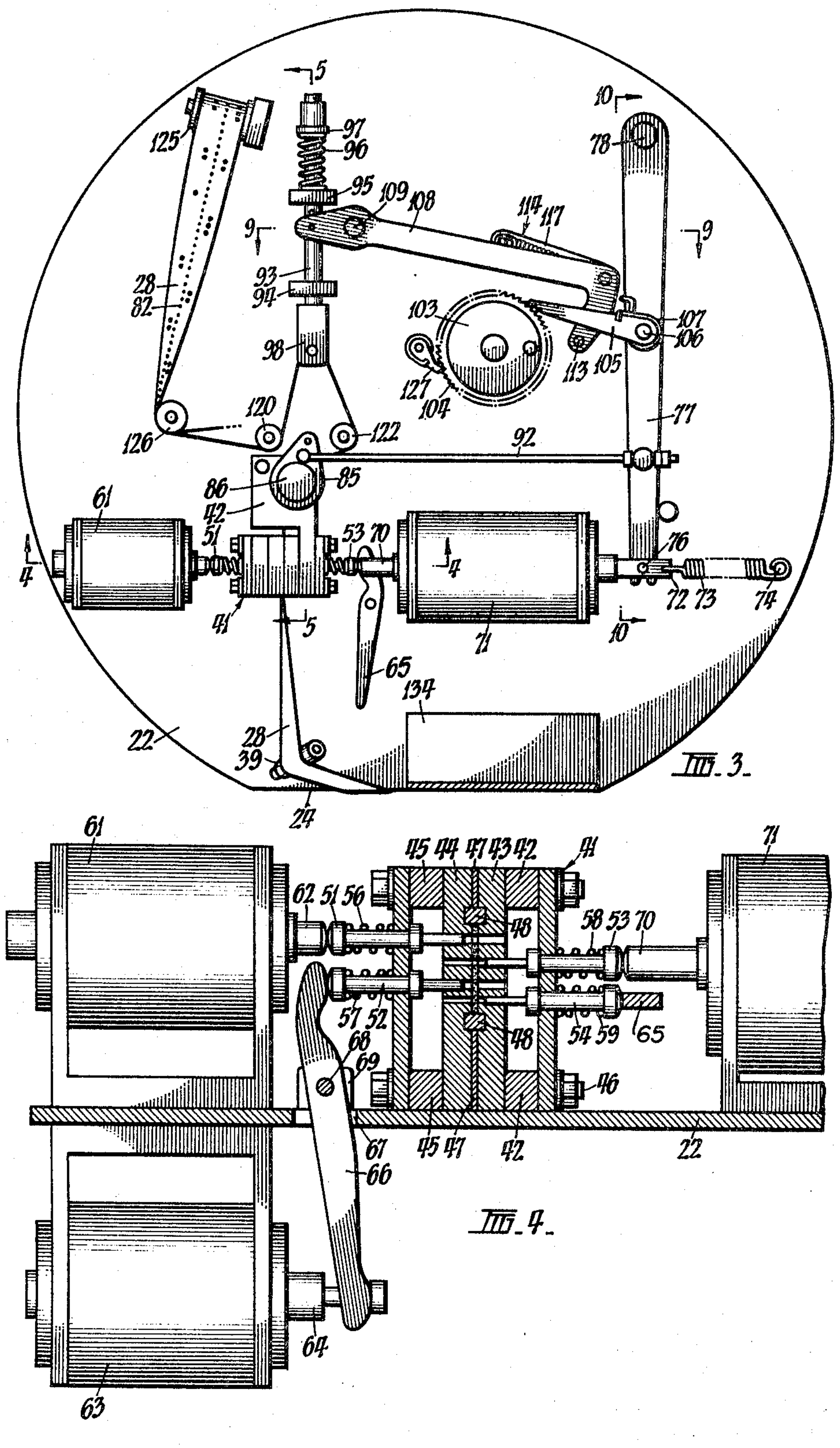
FIGURE 3 is a plan view of certain components mounted on a platform of the recorder.
FIGURE 4 is a section on the line 4—4 in FIGURE 3.
Figure 5:
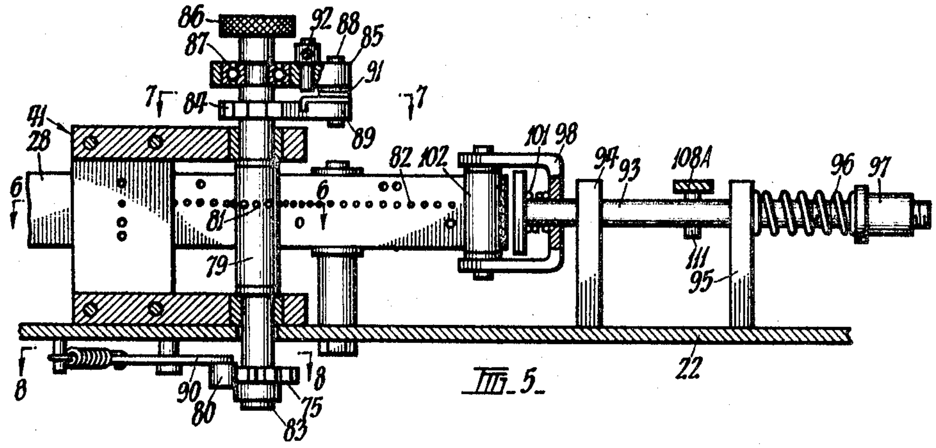
FIGURE 5 is a section on the line 5—5 in FIGURE 3.
Figure 6:
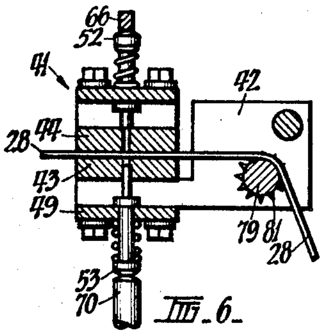
FIGURE 6 is a section on the line 6—6 in FIGURE 5.

The punching head comprises upper and lower identical notched plates 42. The notches of these plates receive the upper and lower ends of a pair of vertical die plates 43, 44. Upper and lower packing strips 45 are placed adjacent the upper and lower ends of die plates 44 and the head is held together by transverse bolts 46. A pair of rearwardly extending rectangular bars 48 are mounted in grooves cut in the opposing faces of die plates 43, 44 and a pair of thin shims 47 separate the die plates so that between bars 48 there is a rearwardly extending narrow gap through which tape 28 is passed. The thickness of shims 47 and tape 28 has been exaggerated in FIGURE 4 more clearly to illustrate the construction of the punching head.

Punching head 41 is provided with four transversely extending punches 51, 52, 53, 54 which register with holes in die plates 43, 44. Punches 51 and 52, which will hereinafter be called "event" punches, are mounted in holes in one side plate 49 and the other two punches 53, 54 are mounted one beneath the other in holes in the other side plate 49. Each of the four punches has a stem portion and bulbous head and the stem portions carry helical compression springs 56, 57, 58 and 59, which normally hold the punches in retracted positions. Event punches 51, 52 are located so that they operate to punch holes in tape 28 at the fifth and second levels respectively of that tape. The fifth level is adjacent to the upper edge of the tape as it passes through the punch head.

A solenoid 61 is mounted on platform 22 with its plunger 62 adjacent the head of an event punch 51 so that energization of the solenoid will cause operation of punch 51. Solenoid 61 will be termed the "first event solenoid." A second solenoid 63 is mounted on the under side of platform 22 directly beneath the first event solenoid and its plunger 64 engages the lower end of a lever 66 which extends upwardly through a slot 67 in the platform and is pivotally mounted on a pin 68 which extends from a bracket 69 fixed to the platform. The upper end of lever 66 addresses the head of the second event punch 52 so that energization of solenoid 63 will cause operation of that punch. Solenoid 63 will be termed "the second event solenoid."

Punch 53 is arranged so that it operates to punch sprocket holes in tape 28 between the third and fourth levels of the tape. This punch is operated by a further solenoid 71 which is mounted on platform 22 and will be referred to as the "sprocket hole solenoid." Punch 54 is arranged so that its operation will punch a hole in the tape at the first level of the tape. This punch is provided for operation by manual actuation of a lever 65 and is used for manual coding of the tape as will be described hereinafter.

The end of the plunger 70 of sprocket hole solenoid 71 remote from punch head 41 is extended in the form of a flat bar 72 and a helical tension spring 73 is fastened between the end of this bar and a peg 74 on the platform 22 to bias the plunger toward a retracted position. The end of bar 72 carries a pin 76 which fits into the forked forward end of a rearwardly extending lever arm 77 which is pivotally mounted at its rear end on a post 78 at the rear of platform 22. Movement of plunger 70 of sprocket hole solenoid 71 causes lever arm 77 to pivot about post 78.

A vertical roller 79 is mounted between the upper and lower plates 42 of punching head 41 rearwardly of the punches and is provided with sprocket teeth 81 at the correct height to engage holes 82 punched in the tape by sprocket punch 53. Roller 79, which will be termed the sprocket roller, is fixed to a vertical shaft 83 which extends through both plates 42 of the punch head. Shaft 83 carries a ratchet wheel 84 and a cam shaped member 85 and is provided at its upper end with a knurled knob 86. Ratchet wheel 84 is fixed to the shaft whereas cam shaped member 85 is journalled on the shaft by means of a ball bearing 87. The tip of cam shaped member 85 carries a downwardly depending pin 88 which carries a pawl 89 at its lower end. A spring 91 on pin 85 biasses pawl 89 into engagement with the teeth of ratchet wheel 84. A connecting rod 92 extends transversely of platform 22 and is pivotally connected at one end to cam shaped member 85 and at its other end to lever arm 77.

Figure 7:
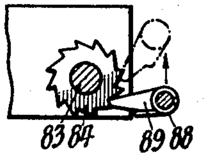
FIGURE 7 is a section on the line 7—7 in FIGURE 5.
Figure 8:
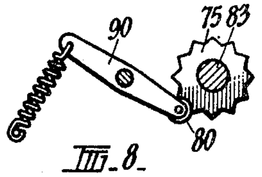
FIGURE 8 is a section on the line 8—8 in FIGURE 5.
Figure 9:
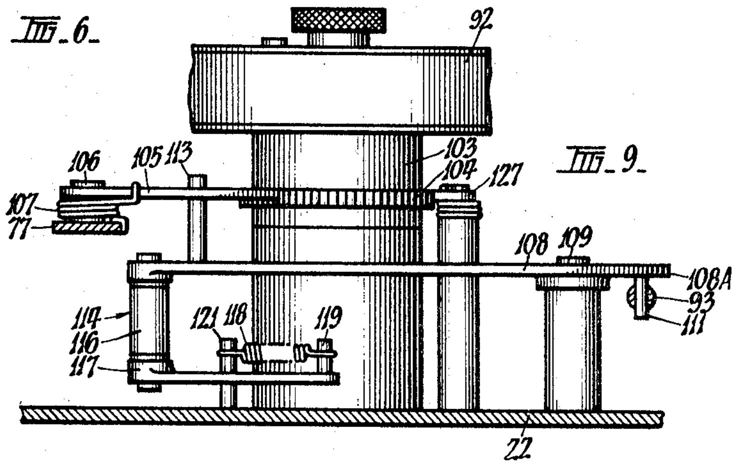
FIGURE 9 is a section, to an enlarged scale, on the line 9—9 in FIGURE 3.
Figure 10:
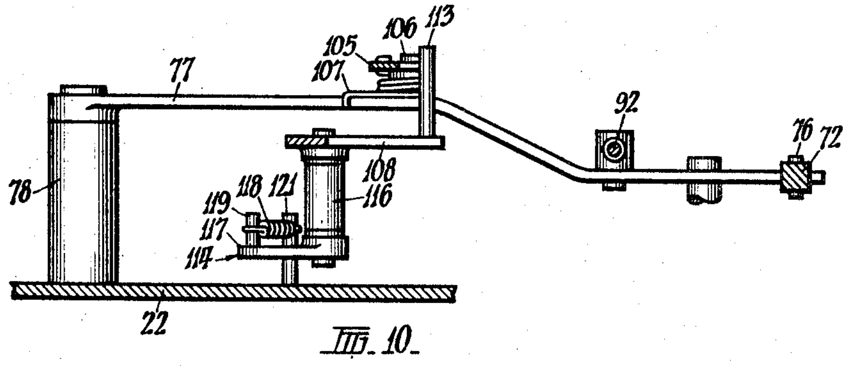
FIGURE 10 is a section, to an enlarged scale, on the line 10—10 in FIGURE 3.

When sprocket hole solenoid 71 is energized, the movement of its plunger 70 not only operates sprocket punch 53 but it also causes lever arm 77 to pivot about post 78. This causes connecting rod 92 to rotate cam shaped member 85 on shaft 83. The cam member 85 is rotated sufficiently to cause the shaft 83 to be turned through an angular displacement corresponding to about 1.5 times the spacing between successive teeth on the ratchet 84, so causing pawl 89 to move up onto the rise of the next succeeding tooth, as shown in dotted outline in FIGURE 7. When, on de-energization of solenoid 71, tension spring 73 draws solenoid plunger 70 back to its retracted position, the consequent return pivotting of lever arm 77 causes connecting rod 92 to draw cam shaped member 85 back to its original position. During the initial part of this return motion the pawl 89 moves, under the influence of its biasing spring, back from its position on the rise of a ratchet tooth (as shown in dotted outline in FIGURE 7) down into the tooth space proper, i.e., hard against the immediately preceding tooth. While this takes place, the tape punches are withdrawn completely clear of the tape, and only the action of an indexing device holds the tape stationary during this brief time interval, as explained below. Thereafter, the engagement of pawl 89 with the teeth of ratchet 84 rotates shaft 83 and sprocket roller 79 to advance the tape through 1/10″. The lower end of shaft 83 extends through a hole in platform 22 and carries a notched indexing wheel 75 which is engaged by a roller 80 at the end of a spring loaded lever 90. This prevents movement of the sprocket roller until sprocket punch is withdrawn from the tape and indexes the rotation of the sprocket roller to ensure that the tape is advanced in exact increments. Thus each time that sprocket hole solenoid 71 operates, a sprocket hole 82 is punched in the tape and the tape is then advanced through exactly 1/10″.

The punched tape is wound onto a take-up spool 92 by a novel take-up mechanism which is designed to maintain a uniform tension in the tape. This mechanism comprises a rearwardly extending tape tensioning plunger 93 which is located rewardly of the punching head and is slidably mounted in holes in a pair of lugs 94, 95 fastened to platform 22. Plunger 93 carries a helical compression spring 96 which acts on lug 95 and an adjustable rear end cap 97 to bias the plunger rearwardly. A channel shaped head piece 98 is slidably mounted on the forward end of plunger 93 with its open mouth facing forwardly and is spring loaded by means of a secondary compression spring 101. A vertical tape guide peg 102 extends between the flanges of head-piece 98 at its forward end.

Figure 11:
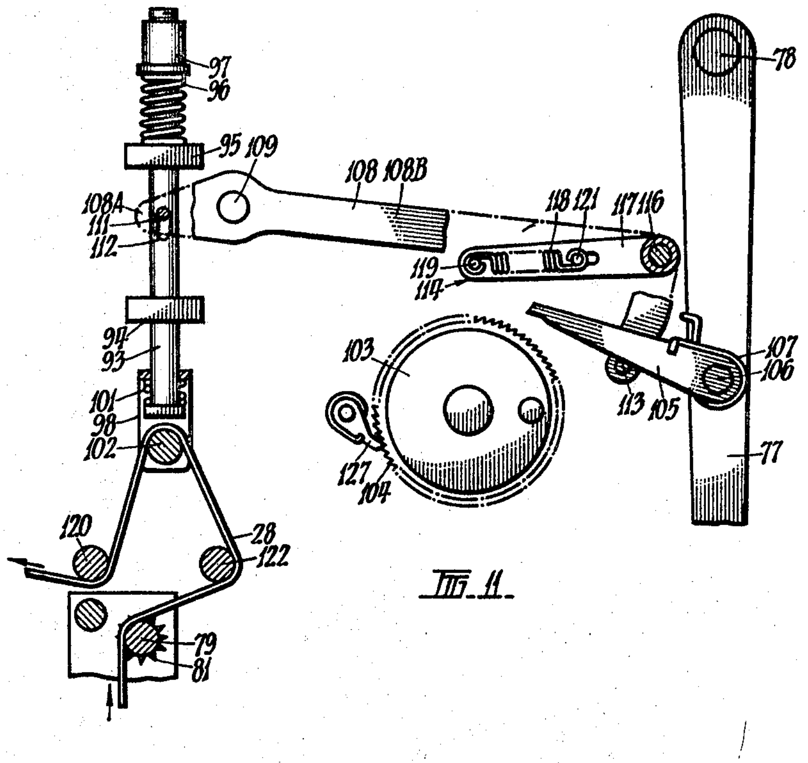
FIGURE 11 is a partly broken and sectioned plan view, to an enlarged scale, of a number of the components shown in FIGURE 3.
Figure 12:
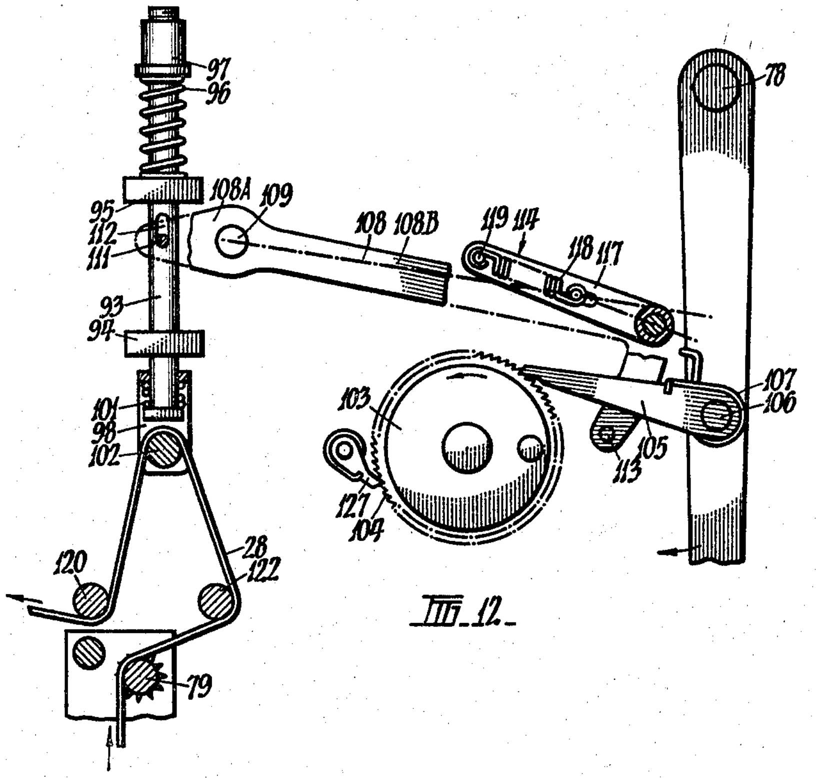
FIGURE 12 is a plan view of the same components as are illustrated in FIGURE 11, but shows the condition of these components during a different stage of the operation of the recorder.

Take-up spool 92 is connected to the upper end of a vertical shaft 103 which is rotatably mounted on platform 22 and is provided with ratchet teeth 104. A long pawl member 105 is pivotally mounted on a pin 106 on lever arm 77 and is spring loaded by a coil spring 107 toward engagement with ratchet teeth 104 on spool shaft 103. However, it can be held out of engagement with ratchet teeth 104 or allowed to engage therewith according to the position of a control lever 108 which is pivotally mounted on a post 109 adjacent tensioning plunger 93. Lever 108 has a relatively short arm 108A provided at its end with a pin 111 which slidably engages a longitudinal slot 112 in plunger 93 and, on the other side of post 109, a cranked arm 108B which turns under long pawl member 104 and carries an upwardly extending pin 113 which engages an edge of pawl member 105. Control lever 108 is movable between a first position as illustrated in FIGURE 11 in which it holds pawl member 105 out of engagement with ratchet teeth 104 and a second position as illustrated in FIGURE 12 in which pawl member 105 can be forced by spring 107 into engagement with those teeth. A spring loaded "over-centre" detent mechanism denoted generally as 114 is attached to control lever 108 to hold it in place when moved to either of these positions. This mechanism comprises a peg 116 depending from lever 108 and carrying an arm 117. A helical tension spring 118 is connected between a peg 119 at the end of arm 117 and another peg 121 which is fixed to platform 22 in such a position that lever 108 passes over it in moving between its first and second positions.

Tape 28 is threaded from sprocket roller 79 around a guide post 122 to guide peg 192 at the forward end of tensioning plunger 93. The tape is passed around peg 102 with an angle of wrap approximately 120° and is then passed around guide post 120 and four fixed guides 123, 124, 125, 126 and finally on to the take-up spool 92.

As described above, tape 28 is advanced intermittently by the action of connecting rod 92, cam shaped member 85, pawl 89 and ratchet 84 consequent to each operation of spocket hole solenoid 71. The take-up mechanism operates to maintain a uniform tension on the punched tape. This tension is maintained by the springs 96, 101 of the tensioning plunger. At one stage of the cycle of operation of the take-up mechanism, plunger 93 is in a forward position as shown in FIGURE 11 with its main biasing spring 96 compressed and control lever 108 in a position in which it holds long pawl member 105 out of engagement with ratchet teeth 104 with pin 111 adjacent the rear end of the longitudinal slot 112 in the plunger. As tape 28 is fed intermittently from sprocket roller 79, tensioning plunger 93 is moved rearwardly by spring 96 to maintain a constant tension on the tape. Slot 112 in the plunger therefore moves with respect to pin 111 and the movement of the plunger allows constant tension to be maintained during several operations of sprocket hole punch 53. During this part of the cycle, control level 108 is held by the spring loaded "over centre" mechanism 114 against the action of the spring loading of pawl member 105. Tensioning plunger 93 moves rearwardly until it reaches a position where the forward end of its slot 112 engages pin 111. When this engagement occurs, control lever 108 is pivoted by the rearward movement of tensioning plunger 93 into the position shown in FIGURE 12 in which it allows pawl member 195 to be forced by its coil spring 107 into engagement with ratchet teeth 104 so that on the next operation of sprocket hole solenoid 71 the pivotal movement of lever arm 77 causes pawl member 105 to rotate the take-up spool shaft 103. A second spring loaded pawl 127 engages ratchet teeth 104 to prevent reverse rotation of the take-up spool shaft. The rotation of take-up spool 92 causes more tape to be taken onto it than is fed forward by sprocket roller 79 so that the tape draws tensioning plunger 93 forward. The plunger is drawn forward until the rear end of slot 112 engages pin 111 on control lever 108 and forces the control lever back to the position in which it holds pawl member 105 out of engagement with ratchet teeth 104. Depending on the amount of tape on takeup spool 92, i.e. the effective diameter of the take-up platform, this may require one or more strokes of the sprocket hole solenoid plunger 70. The secondary plunger spring 101 takes up movement of the plunger 93 which is in excess of that required to move control lever 108 into its holding position and thus allows sprocket hole solenoid plunger 70 to complete an integral number of strokes. The take-up mechanism is now in its original condition so that the plunger can again move rearwardly to maintain uniform tension in the tape and the complete cycle of operation is repeated.

The two event solenoids 61, 63 and the sprocket hole solenoid 71 are connected with an electric timer 130 into an electric circuit which is powered by a 6 volt nickelcadmium battery 132. For the sake of clarity, the wiring, contacts and electronic components of the circuit are not shown in FIGURES 1 to 13 and the circuit will be hereinafter described with reference to FIGURE 14. The battery 132 is charged by solar cells 133 which are mounted on a bracket 134 at the forward end of platform 22 so as to lie immediately beneath a sealed window 136 built into an outer casing 137 of the recorder. Casing 137 is in the form of a generally cylindrical canopy having a peripheral flange 138 at its lower end whereby it is bolted to base plate 21 by means of fixing bolts 139. An O-ring seal 141 is provided between flange 138 and base plate 21 to prevent ingress of dust and moisture.

Figure 14:
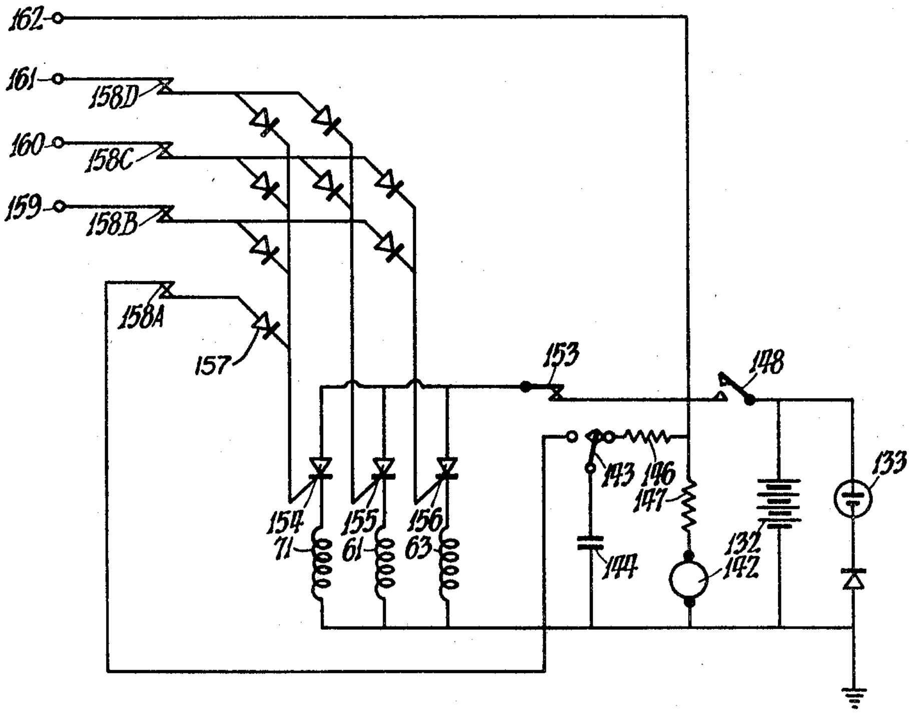
FIGURE 14 is a schematic diagram of the electric circuit of the recorder.

The electric circuit of the recorder is illustrated schematically in FIGURE 14. As shown in this figure, the electric timer comprises an electrically wound clock 142 which controls the operation of a double-throw microswitch 143. A 0.1 micro-farad capacitor 144, a 10 kilo-ohm resistor 146 and a 10 ohm resistor 147 are also included in the timer. Power is supplied to the timer from the battery 132 through an on-off control switch 148. Solenoids 71, 61 and 63 are connected in parallel and across the battery via a switch 153 and the main switch 148. The anodes and cathodes of silicon controlled rectifiers 154, 155, 156 are connected in series with solenoids 71, 61, 63 respectively. The gate of rectifier 154 is connected in series through a diode 157 and switch 158A of ganged switches 158A, 158B, 158C and 158D to one pole of micro-switch 143. Three terminals 159, 160, 161 (which project from the casing of the recorder) are connected via switches 158B, 158C and 158D respectively and a diode matrix to the gates of the silicon controlled rectifiers so that terminal 159 is connected to the gates of rectifiers 154 and 156, terminal 160 is connected to the gates of all three rectifiers and terminal 161 is connected to the gates of rectifiers 154 and 155. A fourth terminal 162 is connected to the line joining switches 148 and 153.

Switch 143 is shown in its normal position but the timer is set so that this switch operates every six minutes to connect battery 132 momentarily to the gate of rectifier 154 and cause that rectifier to conduct. This in turn causes operation of solenoid 71 to punch a sprocket hole. Switch 153 is normally closed but is opened momentarily by movement of lever arm 77 at the end of the stroke of the sprocket hole punch to prevent further conduction through the rectifier. Bridging of terminals 162 and 161 fires rectifiers 154 and 155 to cause simultaneous operation of solenoids 71 and 61. Bridging of terminals 162 and 160 fires all three rectifiers to cause simultaneous operation of the three solenoids. Bridging of terminals 162 and 159 fires rectifiers 154 and 156 to cause simultaneous operation of solenoids 71 and 63. The movable contacts of ganged switches 158A, 158B, 158C, 158D are mounted on lever arm 77 so that the switches are opened as soon as lever arm 77 is moved by operation of sprocket hole solenoid 71 and remain open until the lever arm returns. This ensures that during the movement of a punch initiated by the timer or by bridging of a pair of the terminals, a further movement cannot be initiated.

From the above, it will be appreciated that bridging of terminals 162 and 161 will cause a hole to be punched at the fifth level of the tape and a sprocket hole to be punched simultaneously, bridging of terminals 162 and 160 will cause holes to be punched simultaneously and the fifth and second levels together with a sprocket hole, and bridging of terminals 162 and 159 causes a hole to be punched at the second level together with a sprocket hole. The sprocket hole punch is operated independently every 6 minutes. A hole punched at the fifth level only adjacent a sprocket hole may represent one event, a hole punched at the second level only adjacent a sprocket hole may represent a second event and a pair of holes at the fifth and second levels may represent a third event.

The above described recorder is particularly suited for use in conjunction with a tilting-bucket rain gauge to record rainfall data over extended periods. It is presently proposed to use the recorder in conjunction with a tilting-bucket rain gauge incorporating a switch, the contacts of which are closed after each fall of one point of rain. The switch is connected across terminals 162 and 161 of the recorder circuit so that after each point of rain, event solenoid 61 and sprocket hole solenoid 71 operate together. The timer is set so that sprocket hole solenoid 71 operates independently every six minutes. During periods when no rain falls, a succession of sprocket holes only will be punched in the tape. If a number of points of rain fall during any six-minute period, then the same number of information holes will be punched by a punch 51 in the tape at the fifth level (with corresponding sprocket holes) between the successive sprocket holes which are not accompanied by information holes and which define that period. For example, on the exemplary length of tape illustrated in FIGURE 13, the information holes 149 would indicate that four points of rain fell over one six-minute period. This period was followed by a period of 24 minutes in which there was less than one point of rain and information hole 151 indicates that, after a further six minutes, a further fall of one point of rain had occurred. Thus, rainfall data is recorded automatically by the recorder and the punch tape is suitable for direct input to a digital computer which can analyse the record and determine the number of points which fell during any six-minute period. Sight inspections can be recorded on the tape by manual operation of coding punch 54 to produce a hole of a distinctive character configuration. For example, the exemplary figure of tape shows a hole 152 punched by the coding punch.

Figure 13:
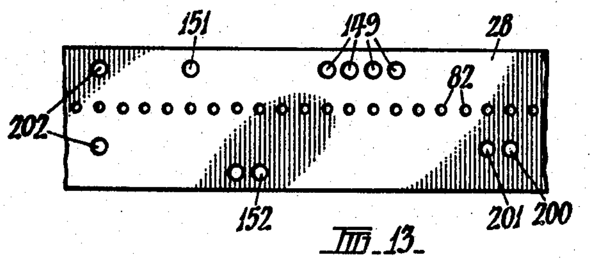
FIGURE 13 illustrates an exemplary length of punched tape produced by the recorder.

If rainfall data only is to be recorded, the second event punch 52 and solenoid 63 are not required. However, the recorder is not limited in application to the recordal of rainfall data but is suitable for recording any events which can be made to close a pair of electrical contacts and the second event punch and solenoid have been incorporated to record a second variable or to indicate the sign (+ or —) of the first variable. For example, the second event punch and solenoid could be controlled by a cup anemometer to record wind run while the first event punch was recording rainfall. Given suitable sensing equipment, this instrument could alternatively be used to record water level data by registering the number and sign of water level changes of preset magnitude occuring within fixed time intervals. The portion of tape shown in FIGURE 13 illustrates a representative record produced by the instrument. The significance of information holes 149 and 151 has been explained above. Holes 200, 201 depict the fact that a water level fell by two incremental divisions (each of chosen preset magnitude) during a six minute period. The twin holes 202 indicate that the water level had risen by one of the incremental divisions after 96 minutes had elapsed from the previous water level recording.

The use of two event solenoids and punches also permits the recording of three non-signed variables as functions of time, the third variable being indicated by two information holes. Conceptually, by suitable electrical circuitry it could be arranged that two characters were punched following momentary closure of contacts on any one of up to fifteen different non-signed variables as functions of time.

The particular recorder and applications described herein are exemplary only and many variations are possible. For example, the classes of events which could be simultaneously recorded by the instrument could be increased by incorporation of a further punch to operate at the third level of tape. It is accordingly to be understood that the invention is in no way limited to the above described applications and constructional details but includes all modifications and adaptations thereof of which fall within the spirit and scope of the appended claims.

We claim:

1. An event recorder comprising tape feeding means for event recordal punch tape, a first punch operable to punch sprocket holes in said tape and operably interconnected with a tape feeding means such that the tape is advanced through a predetermined distance responsive to each operation of the first punch, at least one second punch operable to punch information holes in said tape, each second punch being aligned with the first punch transversely of the direction of tape feed and operably interconnected with the first punch so that the first punch operates simultaneously with each second punch, and means to cause the first punch to operate independently at predetermined time intervals, whereby, in use, the recorder produces a punched tape having sprocket holes disposed at equal spacings longitudinally of the tape and laterally adjacent some of which there are information holes, there being no information holes laterally adjacent certain of the sprocket holes which certain sprocket holes constitute a record of said predetermined time intervals.

2. An event recorder as claimed in claim 1 and further comprising first and second solenoids, electrical energization of which causes operation of the first and second punches, respectively.

3. An event recorder as claimed in claim 2, in which the first and second solenoids are connected in an electric circuit which provides the operable interconnection between the first and second punches.

4. An event recorder as claimed in claim 2, in which the means to cause the first punch to operate independently at predetermined time intervals comprises an electric clock and a switch which is controlled by the electric clock and is electrically connected with said first solenoid.

5. An event recorder as claimed in claim 1, in which said tape feeding means comprises a sprocket having teeth which engage the sprocket holes formed in the tape by said first punch and a mechanism which rotates the sprocket on return motion of said first punch after operation of said first punch.

6. An event recorder as claimed in claim 5, in which said mechanism comprises a ratchet wheel rotatably coupled to said sprocket, a member rotatable about the axis of rotation of the ratchet wheel, a pawl pivotally mounted on said member for engagement with said ratchet wheel, a lever arm pivotable about a fixed axis, means to pivot the lever arm about said fixed axis on movement of said first punch, and a connecting rod connecting said lever arm with said pawl carrying member whereby, on actuation of said first punch, the pawl carrying member is rotated in one direction and on return movement of said first punch, the pawl carrying member is rotated back in the other direction, engagement of the pawl with the ratchet wheel then rotating the ratchet wheel, and therefore the sprocket with it.

7. An event recorder as claimed in claim 1, and further comprising tape winding apparatus for winding the tape on to a take-up package, said tape winding apparatus comprising means rotatably to support a take-up package, take-up package drive means operable to rotate the package and cause tape advanced by said feeding means to be taken on to said take-up package, a tape guide to engage the tape between said feeding means and the take-up package, biasing means biasing the tape guide in one direction, and control means interconnected with the tape guide and the take-up package drive means such that normally the take-up package drive means is inoperative and the biasing means moves the tape guide in said one direction to accommodate increases in the length of the tape between the feeding means and the take-up package but the take-up package, causing the tape to be taken on to control means renders said drive means operable to rotate when the tape guide reaches a predetermined position the that package and the tape guide to be drawn by the tape in the opposite direction.

8. An event recorder as claimed in claim 7, in which the take-up package drive means is operably connected to the feeding means so that when it is rendered operable by the control means it operates simultaneously with the feeding means.

9. An event recorder as claimed in claim 8, in which the take-up package drive means comprises a drive shaft for the take-up package, ratchet teeth on said drive shaft, a pawl member connected to the feeding means so that it is moved on operation of the feeding means, said pawl member being engageable with said ratchet teeth such that its movement causes rotation of the shaft but being normally held out of engagement with the ratchet teeth by the control means.

10. An event recorder as claimed in claim 1 and further comprising tape winding apparatus for winding the tape on to a take-up package; wherein the tape feeding means comprises a sprocket having teeth which engage the sprocket holes formed in the tape by the first said punch, a ratchet wheel rotatable with said sprocket, a member rotatable about the axis of rotation of the ratchet wheel, a pawl pivotally mounted on said member for engagement with said ratchet wheel, a lever arm pivotable about a fixed axis, means to pivot the lever arm about said fixed axis on movement of first said punch, and a connecting rod connecting said lever arm with the pawl carrying member whereby, on actuation of first said punch the pawl carrying member is rotated in one sense and on return movement of first said punch the pawl carrying member is rotated back in the other sense, engagement of the pawl with the ratchet wheel then rotating the ratchet wheel and therefore the sprocket with it; and wherein said tape winding apparatus comprises means rotatably to support a take-up package, a drive shaft for the take-up package, a ratchet teeth on said drive shaft, a pawl member pivotally mounted on said lever arm and engageable with said ratchet teeth such that its movement with said lever arm causes rotation of the shaft, a tape guide to engage the tape between said feeding means and the take-up package, biasing means biasing the tape guide in one direction, and control means operatively interconnected with the tape guide such that normally said pawl member is held out of engagement with the ratchet teeth by the control means and the biasing means moves the tape guide in said one direction to accommodate increases in the length of the tape between the feeding means and the take-up package but when the tape guide reaches a predetermined position the control means is operated to cause engagement of the pawl member with said ratchet teeth, thereby causing the shaft to be rotated, tape to be taken on to said package and the tape guide to be drawn by tape in the opposite direction.

11. An event recorder as claimed in claim 1 and further comprising tape winding apparatus for winding the tape on to a take-up package, wherein said tape winding apparatus comprises a drive shaft for the take-up package, ratchet teeth on said drive shaft, a pawl member connected to the feeding means so that it is moved on operation of the feeding means, said pawl member being engageable with said ratchet teeth such that its movement causes rotation of the shaft, a plunger, biasing means biasing the plunger in one direction, a tape guide mounted on the plunger to engage the tape between said feeding means and the take-up package, and a control lever pivotally mounted between its ends, one of the ends of the control lever normally engaging said pawl member to hold said pawl member out of engagement with said ratchet teeth and the other end of said control lever engaging the plunger whereby it is moved by the plunger such as to allow the pawl member to engage the ratchet teeth when the plunger reaches a predetermined position.

12. An event recorder as claimed in claim 1 and further comprising tape winding apparatus for winding the tape on to a take-up package, wherein said tape winding apparatus comprises a drive shaft for the take-up package, ratchet teeth on said drive shaft, a pawl member connected to the feeding means so that it is moved on operation of the feeding means, said pawl member being engageable with said ratchet teeth such that its movement causes rotation of the shaft, a plunger, a slot in the plunger, biasing means biasing the plunger in one direction, a tape guide mounted on the plunger to engage the tape between said feeding means and the take-up package, and a control lever pivotally mounted between its ends, one of the ends of the control lever normally engaging said pawl member to hold said pawl member out of engagement with said ratchet teeth and the other end of said control lever engaging said slot in the plunger whereby it is moved by the plunger such as to allow the pawl member to engage the ratchet teeth when the plunger reaches a predetermined position.

13. An event recorder as claimed in claim 1, which comprises plural second punches operable to punch information holes in said tape.

14. A method of recording events on event recordal punch tape comprising the steps of, responsive to the occurrence of each event to be recorded, punching an information hole in the tape at an information level of the latter and simultaneously punching a sprocket hole in the tape with the two holes aligned laterally of the tape; at predetermined time intervals between occurrences of the events to be recorded punching only sprocket holes in the tape; and, responsive to each punching of a sprocket hole in the tape, advancing the tape through a predetermined distance so that the sprocket holes are formed at equal spacings along the tape.

References Cited

UNITED STATES PATENTS

| | | | |
|---|---|---|---|
| 2,981,587 | 4/1961 | Kennedy | 346—79 X |
| 3,307,197 | 2/1967 | Sandrick et al. | 346—79 X |

WILLIAM S. LAWSON, Primary Examiner

U.S. Cl. X.R.

234—39, 108, 128; 346—1, 79